US008229651B2

(12) United States Patent
Walker

(10) Patent No.: US 8,229,651 B2
(45) Date of Patent: Jul. 24, 2012

(54) FUEL CORRECTION SYSTEMS AND METHODS

(75) Inventor: Lee C. Walker, Swartz Creek, MI (US)

(73) Assignee: GM Global Technology Operations LLC

( * ) Notice: Subject to any disclaimer, the term of this patent is extended or adjusted under 35 U.S.C. 154(b) by 354 days.

(21) Appl. No.: 12/695,549

(22) Filed: Jan. 28, 2010

(65) Prior Publication Data

US 2011/0184628 A1 Jul. 28, 2011

(51) Int. Cl.
*G06F 7/00* (2006.01)
*F02D 41/00* (2006.01)

(52) U.S. Cl. ........................................ 701/104; 123/675

(58) Field of Classification Search .................. 701/103, 701/104, 105, 54; 123/436, 435, 494, 675, 123/492, 493

See application file for complete search history.

(56) References Cited

U.S. PATENT DOCUMENTS 5,638,790 A * 6/1997 Minowa et al. ............... 123/436
6,092,507 A * 7/2000 Bauer et al. ................... 123/430

* cited by examiner

*Primary Examiner* — Mahmoud Gimie

(57) ABSTRACT

A fuel control system for a vehicle comprises a fuel delivery module, a torque ratio determination module, and a correction factor module. The fuel delivery module supplies first and second amounts of diesel fuel to a cylinder of an engine during first and second combustion cycles for the cylinder, respectively. The second combustion cycle occurs after the first combustion cycle. The torque ratio determination module determines a torque ratio based on torque output by the engine during the first combustion cycle and a torque requested for the first combustion cycle. The correction factor module determines a fuel correction factor based on the torque ratio and adjusts the second amount based on the fuel correction factor.

20 Claims, 3 Drawing Sheets

FUEL CORRECTION SYSTEMS AND METHODS

FIELD

The present disclosure relates to internal combustion engines and more particularly to engine control systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Air is drawn into an engine through an intake manifold. A throttle valve controls airflow into the engine. The air mixes with fuel provided by one or more fuel injectors to form an air/fuel mixture. The air/fuel mixture is combusted within one or more cylinders of the engine. In diesel engine systems, combustion is initiated by injection of the fuel into the cylinders. More specifically, heat provided by compression ignites injected fuel.

Combustion of the air/fuel mixture produces drive torque. More specifically, drive torque is generated through heat release and expansion that occurs during combustion of the air/fuel mixture within the cylinders. Torque is transferred by a crankshaft of the engine through a driveline (not shown) to one or more wheels to propel a vehicle. Exhaust gas is expelled from the cylinders to an exhaust system.

An engine control module (ECM) controls the torque output of the engine based on a desired torque. The desired torque may be based on driver inputs, such as accelerator pedal position, brake pedal position, cruise control inputs, and/or other suitable driver inputs. The desired torque may also be based on torque requested by other vehicle systems, such as a transmission control system, a hybrid control system, and/or a chassis control system. The ECM controls the torque output of the engine by adjusting various engine operating parameters, such as airflow into the engine, the amount of fuel injected, and the timing of the fuel injection.

SUMMARY

A fuel control system for a vehicle comprises a fuel delivery module, a torque ratio determination module, and a correction factor module. The fuel delivery module supplies first and second amounts of diesel fuel to a cylinder of an engine during first and second combustion cycles for the cylinder, respectively. The second combustion cycle occurs after the first combustion cycle. The torque ratio determination module determines a torque ratio based on torque output by the engine during the first combustion cycle and a torque requested for the first combustion cycle. The correction factor module determines a fuel correction factor based on the torque ratio and adjusts the second amount based on the fuel correction factor.

A fuel control method for a vehicle comprises: supplying first and second amounts of diesel fuel to a cylinder of an engine during first and second combustion cycles for the cylinder, respectively, wherein the second combustion cycle occurs after the first combustion cycle; determining a torque ratio based on torque output by the engine during the first combustion cycle and a torque requested for the first combustion cycle; determining a fuel correction factor based on the torque ratio; and adjusting the second amount based on the fuel correction factor.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
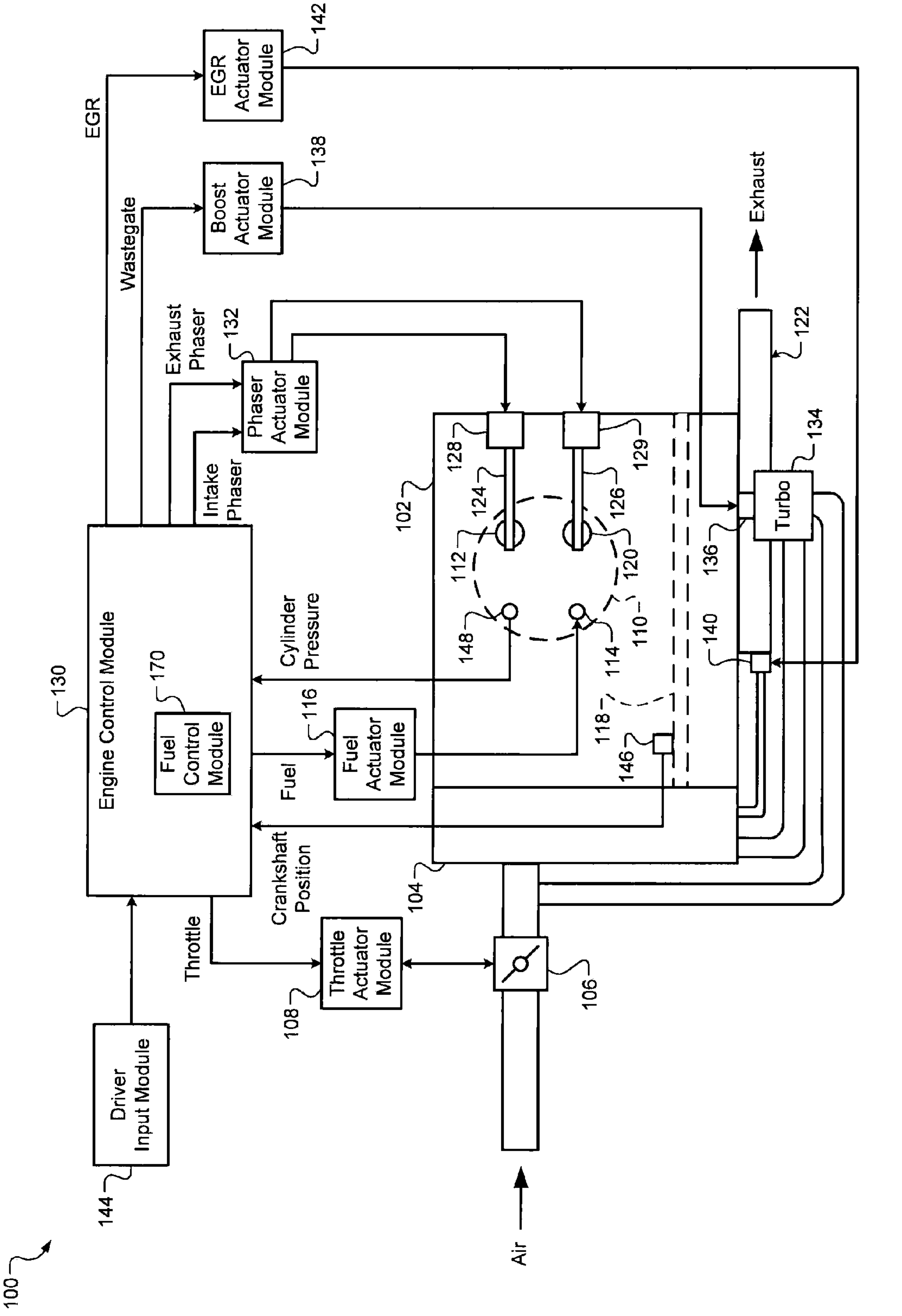
FIG. 1 is a functional block diagram of an exemplary diesel engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A diesel-type internal combustion engine combusts a mixture of air and diesel fuel to generate drive torque. The amount of fuel supplied for combustion may be specified to produce a desired torque. Variations in the energy content of the diesel fuel, however, may cause the amount of torque produced through combustion to vary from the desired torque.

An engine control module (ECM) according to the present disclosure supplies a desired amount of fuel to a cylinder for combustion during a combustion cycle. The ECM determines an actual torque produced by combustion of the fuel and determines a torque ratio based on the desired torque and the actual torque. The ECM determines a fuel correction factor based on the torque ratio and adjusts the amount of fuel supplied to the cylinder during later combustion cycles based on the fuel correction factor. In this manner, the ECM enables adjustment of the amount of fuel supplied to the cylinder during later combustion events to compensate for variations in the energy content of the diesel fuel.

Referring now to FIG. 1, a functional block diagram of an exemplary diesel engine system 100 is presented. The diesel engine system 100 includes an engine 102 that combusts a mixture of air and diesel fuel to produce drive torque. One or more motor-generators (not shown) that selectively produce drive torque may also be implemented. Air is drawn into an intake manifold 104 through a throttle valve 106. A throttle actuator module 108 controls opening of the throttle valve 106 and, therefore, airflow into the engine 102. The throttle actuator module 108 may include, for example, an electronic throttle controller (ETC).

Air from the intake manifold 104 is drawn into cylinders of the engine 102. While the engine 102 may include multiple cylinders, for illustration purposes, only a single representative cylinder 110 is shown. For example only, the engine 102 may include 1, 2, 3, 4, 5, 6, 8, 10, and/or 12 cylinders. Air from the intake manifold 104 is drawn into the cylinder 110 through an associated intake valve 112. Lowering of a piston (not shown) within the cylinder 110 draws air into the cylinder 110.

After the piston reaches a bottom most position, referred to as bottom dead center (BDC), the piston rises and compresses the air within the cylinder 110. Compression of the air within the cylinder 110 generates heat. In some engine systems, fuel is injected as air is drawn into the cylinder 110 or during compression.

An engine control module (ECM) 130 controls the amount (e.g., mass) of fuel injected by a fuel injector 114. More specifically, a fuel actuator module 116 controls opening of the fuel injector 114 based on signals from the ECM 130. For example only, the fuel actuator module 116 may control the period of time that the fuel injector 114 is maintained in a fully open position, which is referred to as an injection pulse width.

The fuel injector 114 may inject fuel directly into the cylinder 110 as shown in FIG. 1. In other implementations, the fuel injector 114 may inject fuel into the intake manifold 104 at a central location or may inject fuel into the intake manifold 104 at multiple locations, such as near the intake valve of each of the cylinders.

The ECM 130 also controls the timing of initiation of combustion. In the diesel engine system 100, the ECM 130 controls the timing of initiation of combustion via the fuel injection timing. The heat generated though compression of the air within the cylinder 110 initiates combustion of fuel when the fuel is injected into the cylinder 110. The time when fuel is supplied to the cylinder 110 may be specified relative to, for example, the TDC position or the BDC position.

Combustion of the air/fuel mixture drives the piston down, and the piston rotatably drives a crankshaft 118. The piston drives the crankshaft 118 down until the piston reaches the BDC position. The piston then begins moving up again and expels the byproducts of combustion through an associated exhaust valve 120. The byproducts of combustion are exhausted from the vehicle via an exhaust system 122.

One combustion cycle, from the standpoint of each cylinder, involves two revolutions of the crankshaft (i.e., 720° of crankshaft rotation). The combustion cycle for each cylinder can be described in terms of four phases: an intake phase; a compression phase; a combustion phase; and an exhaust phase. For example only, the piston lowers toward the BDC position and air is drawn into the cylinder 110 during the intake phase. The piston rises toward the TDC position and compresses the air within the cylinder 110 during the compression phase. Fuel is supplied into the cylinder 110 and is combusted with the air within during the combustion phase, and the combustion drives the piston toward the BDC position. The piston rises toward the TDC to expel the exhaust gas produced via combustion from the cylinder 110 during the exhaust phase.

The intake valve 112 is controlled by an intake camshaft 124, and the exhaust valve 120 is controlled by an exhaust camshaft 126. In other implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders.

An intake cam phaser 128 controls the intake camshaft 124 and, therefore, controls opening (e.g., lift, timing, and duration) of the intake valve 112. Similarly, an exhaust cam phaser 129 controls the exhaust camshaft 126 and, therefore, controls opening (e.g., lift, timing, and duration) of the exhaust valve 120. The timing of the opening of the intake and exhaust valves 112 and 120 may be specified relative to, for example, the TDC position or the BDC position. A phaser actuator module 132 controls the intake cam phaser 128 and the exhaust cam phaser 129 based on signals from the ECM 130.

The diesel engine system 100 may also include a boost device that provides pressurized air to the intake manifold 104. For example only, the diesel engine system 100 includes a turbocharger 134. The turbocharger 134 is powered by exhaust gases flowing through the exhaust system 122 and provides a compressed air charge to the intake manifold 104. The turbocharger 134 may include a variable geometry turbo (VGT) or another suitable type of turbocharger. Other engine systems may also include more than one turbocharger or boost device.

A wastegate 136 selectively allows exhaust gas to bypass the turbocharger 134, thereby reducing the turbocharger's output (or boost). The ECM 130 controls boost of the turbocharger 134 via a boost actuator module 138. The boost actuator module 138 may modulate the boost of the turbocharger 134 by, for example, controlling the position of the wastegate 136 or the turbocharger 134 itself (e.g., vane position).

An intercooler (not shown) may be implemented to dissipate some of the compressed air charge's heat. This heat may be generated when the air is compressed. Another source of heat is the exhaust system 122. Other engine systems may include a supercharger that provides compressed air to the intake manifold 104 and is driven by the crankshaft 118.

The diesel engine system 100 may also include an exhaust gas recirculation (EGR) valve 140, which selectively redirects exhaust gas back to the intake manifold 104. While the EGR valve 140 is shown in FIG. 1 as being located upstream of the turbocharger 134, the EGR valve 140 may be located downstream of the turbocharger 134. An EGR cooler (not shown) may also be implemented to cool the redirected exhaust gas before the exhaust gas is provided to the intake manifold 104. The ECM 130 controls opening of the EGR valve 140 via an EGR actuator module 142. The EGR opening may be adjusted to adjust one or more combustion parameters and/or adjust the boost of the turbocharger 134.

The ECM 130 regulates the torque output of the engine 102 based on driver inputs and other inputs. The driver inputs may include, for example, accelerator pedal position, brake pedal position, cruise control inputs, and/or other suitable driver inputs. A driver input module 144 provides the driver inputs to the ECM 130. The other inputs may include, for example, inputs from various sensors and/or inputs from other vehicle control modules (not shown), such as a transmission control module, a hybrid control module, and a chassis control module.

The ECM 130 receives a crankshaft position signal from a crankshaft sensor 146 based on position of the crankshaft 118. For example only, the crankshaft sensor 146 may include a variable reluctance (VR) sensor or another suitable type of crankshaft sensor. The crankshaft position signal may include a pulse train. Each pulse of the pulse train may be generated as a tooth of an N-toothed wheel (not shown) that rotates with the crankshaft 118, passes the VR sensor. Accordingly, each pulse corresponds to an angular rotation of the crankshaft 118 by an amount equal to 360° divided by N teeth. The N-toothed wheel may also include a gap of one or more missing teeth, and the gap may be used as an indicator of one complete rotation of the crankshaft 118.

The crankshaft position signal may be used to determine the rotational speed of the crankshaft 118 (i.e., engine speed) in revolutions per minute (rpm). More specifically, the engine speed may be determined based on the period of time between the pulses of the pulse train.

The ECM 130 also receives a cylinder pressure signal from a cylinder pressure sensor 148. The cylinder pressure sensor 148 measures pressure within the cylinder 110 and generates the cylinder pressure signal accordingly. The cylinder pressure sensor 148 may be implemented independently or in association with another component associated with the cylinder 110.

In some engine systems having more than one cylinder, only the single cylinder pressure sensor 148 may be provided. In other engine systems, one or more cylinder pressure sensors like the cylinder pressure sensor 148 may be provided. For example only, one cylinder pressure sensor may be provided for each cylinder. The ECM 130 may also receive signals from other sensors, such as an engine coolant temperature sensor, a manifold absolute pressure (MAP) sensor, a mass air flow (MAF) sensor, a throttle position sensor, an intake air temperature (IAT) sensor, and/or other suitable sensors.

The diesel engine system 100 includes a fuel control module 170 according to the principles of the present disclosure. While the fuel control module 170 is shown as being located within the ECM 130, the fuel control module 170 may be located in another suitable location, such as external to the ECM 130.

The fuel control module 170 supplies a desired amount of fuel to the cylinder 110 to achieve a desired torque. The fuel control module 170 monitors the cylinder pressure measured during combustion of the supplied fuel and determines an actual amount of torque produced by the cylinder 110 based on the cylinder pressure.

The fuel control module 170 determines a fuel correction factor for the cylinder 110 based on a ratio of the actual torque produced during the combustion of the desired amount of fuel to the desired torque. The fuel control module 170 applies the fuel correction factor to adjust desired amounts of fuel supplied to the cylinder 110 during later combustion events. In this manner, an amount of fuel supplied to achieve desired torques specified for those later combustion events is adjusted based on the fuel correction factor.

Figure 2:
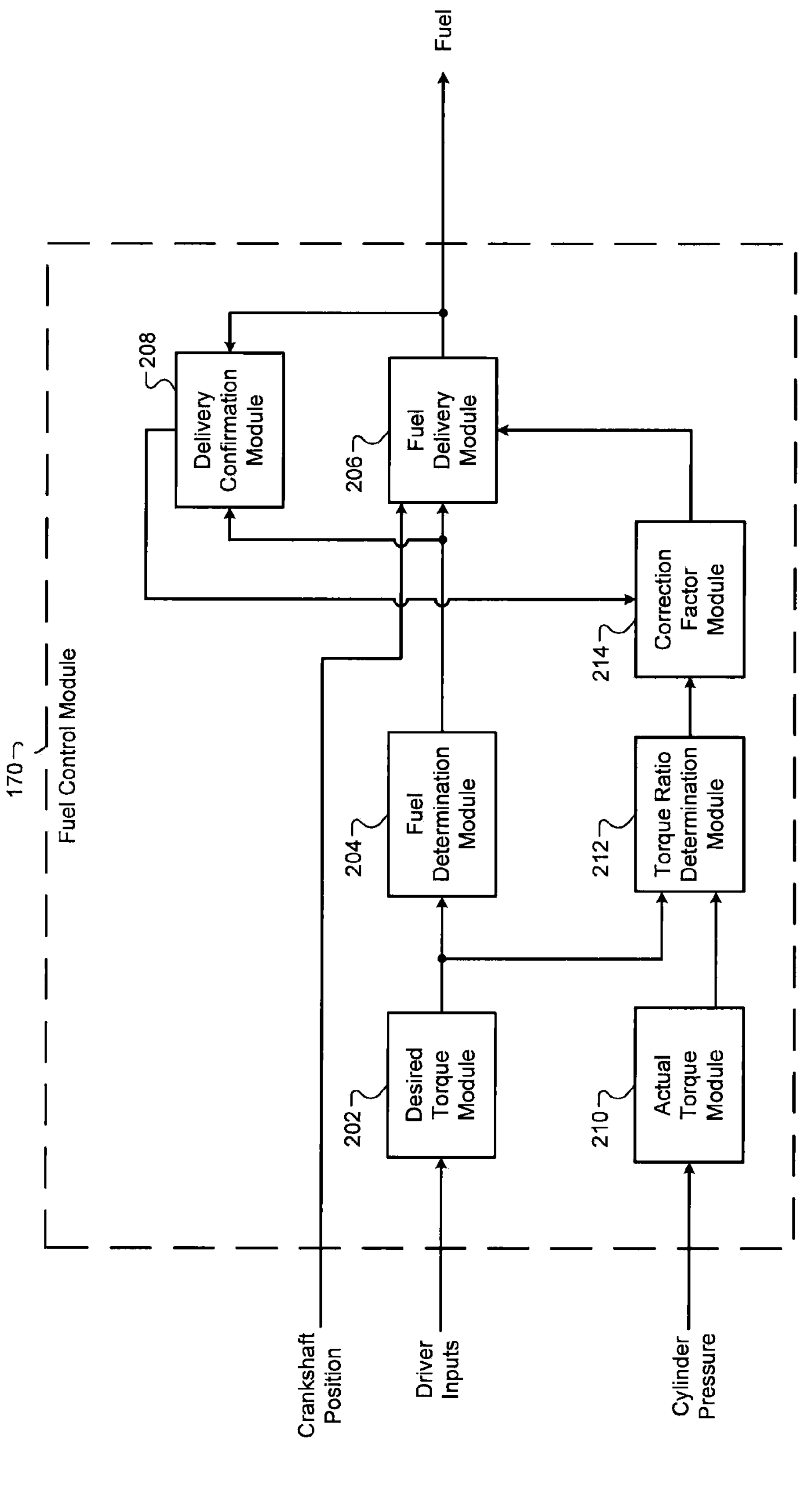
FIG. 2 is a functional block diagram of an exemplary fuel control module according to the principles of the present disclosure.

Referring now to FIG. 2, a functional block diagram of an exemplary implementation of the fuel control module 170 is presented. The fuel control module 170 includes a desired torque module 202, a fuel determination module 204, a fuel delivery module 206, and a delivery confirmation module 208. The fuel control module 170 also includes an actual torque module 210, a torque ratio determination module 212, and a correction factor module 214.

The desired torque module 202 determines a desired torque to be produced and provides the desired torque to the fuel determination module 204. The desired torque module 202 may determine the desired torque based on the driver inputs, torque requested by various vehicle systems, operating parameters, and/or other suitable parameters. The operating parameters upon which the desired torque may be determined may include, for example, the engine speed, the compressed air charge provided by the turbocharger 134, the MAP, and the IAT.

The fuel determination module 204 determines the desired amount (e.g., mass) of fuel for the cylinder 110 based on the desired torque. In other words, the fuel determination module 204 determines the desired amount of fuel to achieve the desired torque. The fuel determination module 204 may determine the desired amount of fuel from, for example, a mapping of desired fuel amounts indexed by desired torque.

The fuel delivery module 206 supplies the desired amount of fuel to the cylinder 110. In other words, the fuel delivery module 206 controls opening of the fuel injector 114 to supply the desired amount of fuel to the cylinder 110. The fuel delivery module 206 controls the amount of fuel supplied by controlling, for example, the period of time that the fuel injector 114 is maintained in the fully open position (i.e., the fuel injection pulse width). The fuel delivery module 206 may determine when to begin supplying the desired amount of fuel to the cylinder 110 based on, for example, the crankshaft position.

Various vehicle systems may selectively override the fuel delivery module's control of the fuel injection. For example only, the fuel delivery module 206 may be overridden to skip provision of fuel to one of the cylinders of the engine 102 for a diagnostic. The delivery confirmation module 208 indicates when the desired amount of fuel was supplied to the cylinder 110. For example only, the delivery confirmation module 208 may determine whether the desired amount of fuel was supplied to the cylinder 110 based on a comparison of the desired amount of fuel and the amount of fuel supplied (e.g., by the fuel injection pulse width).

The actual torque module 210 determines the actual torque produced by the cylinder 110 based on one or more cylinder pressures measured by the cylinder pressure sensor 148 during combustion of the supplied fuel. In engine systems having at least one cylinder pressure sensor for each cylinder, the actual torque module 210 may determine a respective actual torque for each cylinder based on the cylinder pressure measured during combustion within the respective cylinders. Discussion of the determination of actual torque based on cylinder pressure measured by a cylinder pressure sensor can be found in commonly assigned U.S. patent application Ser. No. 12/367,975, the disclosure of which is herein incorporated in its entirety.

The torque ratio determination module 212 determines a torque ratio for the cylinder 110 based on the desired torque for the cylinder 110 and the actual torque produced through combustion of the desired amount of fuel. For example only, the torque ratio determination module 212 may determine the torque ratio as the quotient of the actual torque divided by the desired torque.

The correction factor module 214 determines the fuel correction factor for the cylinder 110 based on the torque ratio. For example only, the correction factor module 214 may determine the fuel correction factor as the difference between one (1.0) and the torque ratio. In other words, the correction factor module 214 may determine the fuel correction factor using the following equation.

$$\text{Fuel Correction Factor} = 1 - \text{Torque Ratio}$$

The correction factor module 214 may also verify that the desired amount of fuel was supplied to the cylinder (e.g., via the indication from the delivery confirmation module 208) before determining the fuel correction factor. In another implementation, the delivery confirmation module 208 disables the correction factor module 214 when the desired amount of fuel is not supplied to the cylinder 110 and enables the correction factor module 214 when the desired amount has been supplied.

The correction factor module 214 outputs the fuel correction factor to the fuel delivery module 206. The fuel delivery module 206 controls the amount of fuel supplied to the cylinder 110 during later combustion events based on the fuel correction factor and desired amounts specified for those later combustion events. For example only, the fuel delivery module may increase or decrease the desired amount of fuel supplied to the cylinder 110 when the fuel correction factor is positive and negative, respectively. The fuel correction factor may also be used to adjust the amount of fuel supplied to the other cylinders of an engine in engine systems including only one cylinder pressure sensor for all of the cylinders.

For purposes of illustration only, a torque ratio of 0.9 (i.e., when the actual torque produced is 90% of the desired torque) corresponds to a fuel correction factor of 0.1 (i.e., 1.0−0.9=0.1 or 10%). Based on the fuel correction factor of 0.1, the fuel delivery module 206 may supply amounts of fuel that are 10% more than the desired fuel amounts specified by the fuel determination module 204 (i.e., supplied amount of fuel=desired fuel amount*1.1) for later combustion events. The fuel correction factor may also be used to adjust the amount of fuel supplied to each of the other cylinders of the engine 102 in implementations including only one cylinder pressure sensor.

Accordingly, the fuel control module 170 adjusts the amount of fuel supplied to the cylinder 110 based on the fuel correction factor during the later combustion events. Adjusting the amount of fuel supplied based on the fuel correction factor enables smooth engine operation while minimizing fuel consumption when variations in energy content of the diesel fuel are present.

Figure 3:
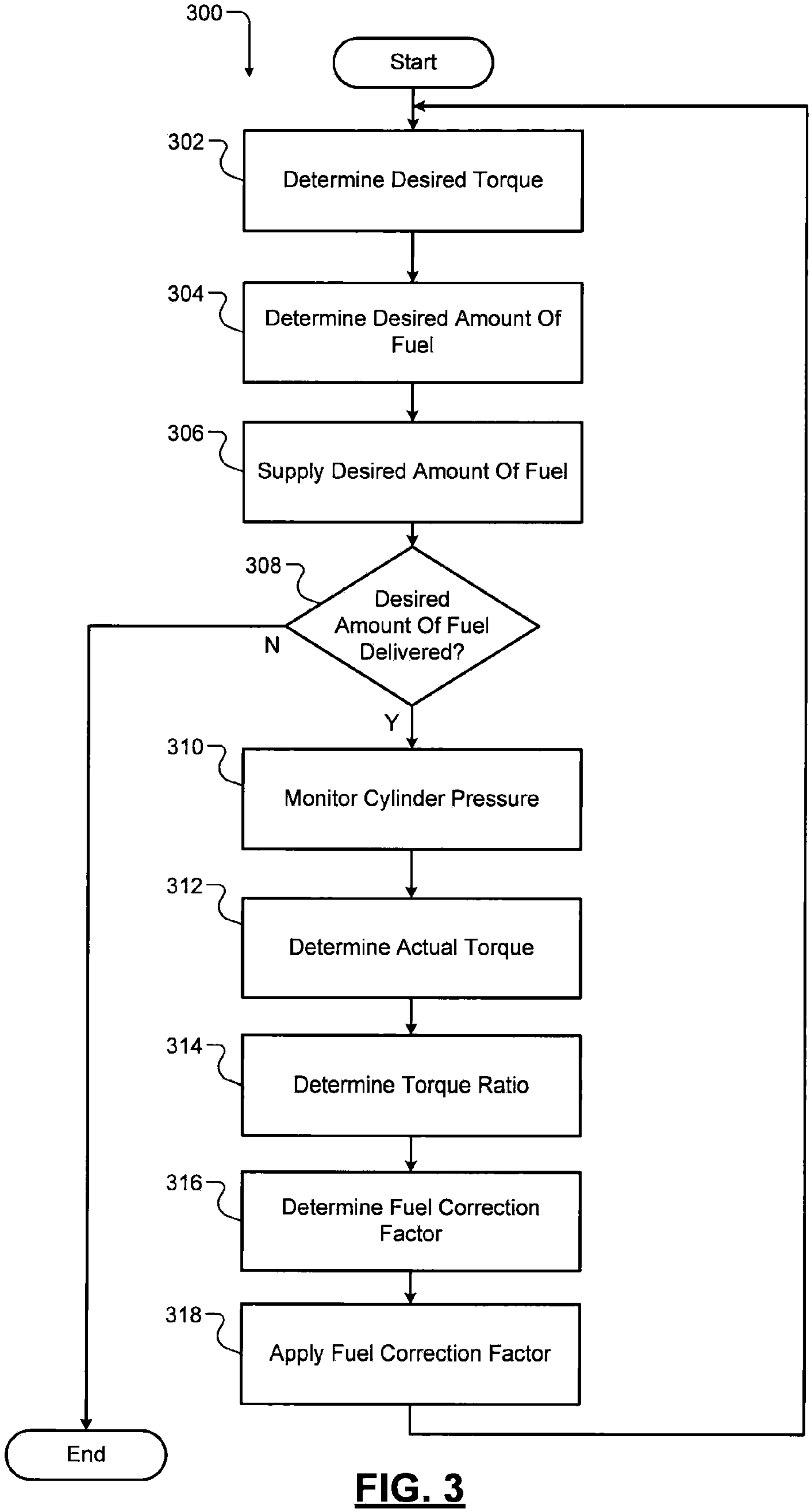
FIG. 3 is a flowchart depicting an exemplary method according to the principles of the present disclosure.

Referring now to FIG. 3, a flowchart depicting an exemplary method 300 is presented. The method 300 begins in step 302 where the method 300 determines the desired torque. The method 300 determines the desired amount of fuel (e.g., mass) for the cylinder 110 in step 304. The method 300 determines the desired amount of fuel based on the desired torque. The method 300 supplies the desired amount of fuel to the cylinder 110 in step 306.

The method 300 determines whether the desired amount of fuel was delivered to the cylinder 110 in step 308. If true, the method 300 proceeds to step 310; if false, the method 300 ends. In this manner, the method 300 avoids applying a fuel correction when the desired fuel amount was not delivered to the cylinder 110. The method 300 monitors the cylinder pressure measured by the cylinder pressure sensor 148 in step 310. The method 300 determines the actual torque produced during the combustion of the desired amount of fuel in step 312.

In step 314, the method 300 determines the torque ratio. The method 300 determines the torque ratio based on a ratio of the actual torque to the desired torque. For example only, the torque ratio may be equal to the quotient of the actual torque divided by the desired torque. The method 300 determines the fuel correction factor for the cylinder 110 in step 316.

The method 300 applies the fuel correction factor in step 318, and the method 300 returns to step 302. In this manner, the fuel correction factor is applied to adjust the amount of fuel supplied to the cylinder 110 during later combustion events within the cylinder 110. In engine systems including only one cylinder pressure sensor and more than one cylinder, the fuel correction factor may also be applied to adjust the amount of fuel supplied for the later combustion events of the other cylinders.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A fuel control system for a vehicle, comprising:

a fuel delivery module that supplies first and second amounts of diesel fuel to a cylinder of an engine during first and second combustion cycles for said cylinder, respectively, wherein said second combustion cycle occurs after said first combustion cycle;

a torque ratio determination module that determines a torque ratio based on torque output by said engine during said first combustion cycle and a torque requested for said first combustion cycle; and a correction factor module that determines a fuel correction factor based on said torque ratio and that adjusts said second amount based on said fuel correction factor.

2. The fuel control system of claim 1 further comprising an actual torque module that determines said torque output by said engine based on at least one pressure within said cylinder measured by a cylinder pressure sensor during said first combustion cycle.

3. The fuel control system of claim 1 wherein said torque ratio determination module determines said torque ratio based on a quotient of said torque output divided by said torque requested.

4. The fuel control system of claim 1 further comprising a disabling module that selectively disables said correction factor module when said first amount is one of greater than and less than a desired first amount.

5. The fuel control system of claim 1 further comprising a fuel determination module that determines first and second desired amounts of said diesel fuel for said first and second combustion cycles, respectively, wherein said fuel delivery module supplies said first amount equal to said first desired amount and supplies said second amount equal to said second desired amount adjusted based on said fuel correction factor.

6. The fuel control system of claim 5 wherein said fuel determination module determines said first desired amount based on said torque requested for said first combustion cycle.

7. The fuel control system of claim 1 wherein said fuel delivery module adjusts an amount of fuel supplied to at least one other cylinder of said engine based on said fuel correction factor during a combustion cycle of said at least one other cylinder that occurs after said first combustion cycle.

8. The fuel control system of claim 1 wherein said fuel delivery module adjusts amounts of fuel supplied to other cylinders of said engine, respectively, based on said fuel correction factor during combustion cycles that occur after said first combustion cycle.

9. The fuel control system of claim 1 wherein said correction factor module determines said fuel correction factor based on a difference between a value of one (1.0) and said torque ratio.

10. The fuel control system of claim 9 wherein said fuel correction factor is equal to said value of one less said torque ratio.

11. A fuel control method for a vehicle, comprising:

supplying first and second amounts of diesel fuel to a cylinder of an engine during first and second combustion cycles for said cylinder, respectively, wherein said second combustion cycle occurs after said first combustion cycle;

determining a torque ratio based on torque output by said engine during said first combustion cycle and a torque requested for said first combustion cycle;

determining a fuel correction factor based on said torque ratio; and adjusting said second amount based on said fuel correction factor.

12. The fuel control method of claim 11 further comprising determining said torque output by said engine based on at least one pressure within said cylinder measured by a cylinder pressure sensor during said first combustion cycle.

13. The fuel control method of claim 11 further comprising determining said torque ratio based on a quotient of said torque output divided by said torque requested.

14. The fuel control method of claim 11 further comprising selectively disabling said adjusting when said first amount is one of greater than and less than a desired first amount.

15. The fuel control method of claim 11 further comprising:

determining first and second desired amounts of said diesel fuel for said first and second combustion cycles, respectively;

supplying said first amount equal to said first desired amount; and supplying said second amount equal to said second desired amount adjusted based on said fuel correction factor.

16. The fuel control method of claim 15 further comprising determining said first desired amount based on said torque requested for said first combustion cycle.

17. The fuel control method of claim 11 further comprising adjusting an amount of fuel supplied to at least one other cylinder of said engine based on said fuel correction factor during a combustion cycle of said at least one other cylinder that occurs after said first combustion cycle.

18. The fuel control method of claim 11 further comprising adjusting amounts of fuel supplied to other cylinders of said engine, respectively, based on said fuel correction factor during combustion cycles that occur after said first combustion cycle.

19. The fuel control method of claim 11 further comprising determining said fuel correction factor based on a difference between a value of one (1.0) and said torque ratio.

20. The fuel control method of claim 19 wherein said fuel correction factor is equal to said value of one less said torque ratio.

* * * * *